Feb. 6, 1934.   E. B. THOMAS   1,946,298
FILLING MECHANISM AND METHOD
Filed Aug. 7, 1926   6 Sheets-Sheet 1

Inventor:
Errold B. Thomas,
by Emery, Booth, Janney & Varney
Attys.

Feb. 6, 1934.  E. B. THOMAS  1,946,298
FILLING MECHANISM AND METHOD
Filed Aug. 7, 1926  6 Sheets-Sheet 2

Inventor:
Errold B. Thomas,
by Emery, Booth, Janney & Varney
Attys.

Feb. 6, 1934. E. B. THOMAS 1,946,298
FILLING MECHANISM AND METHOD
Filed Aug. 7, 1926 6 Sheets-Sheet 3
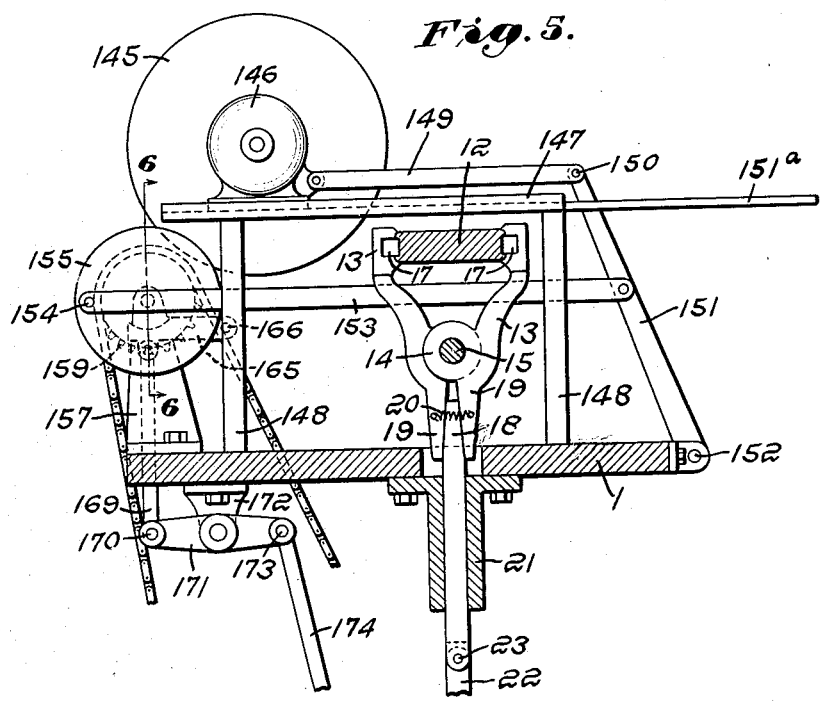
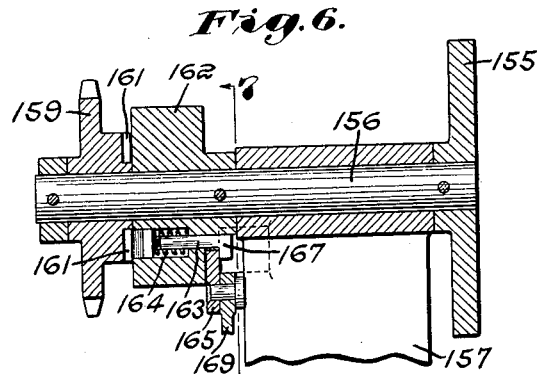
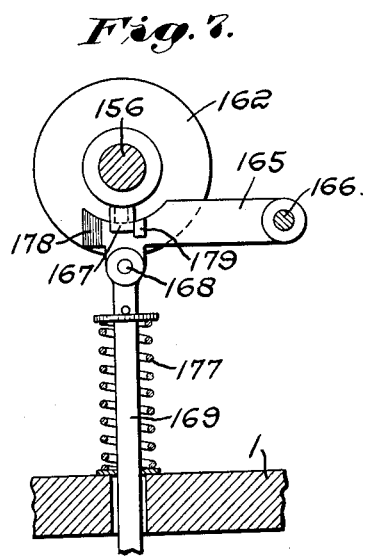
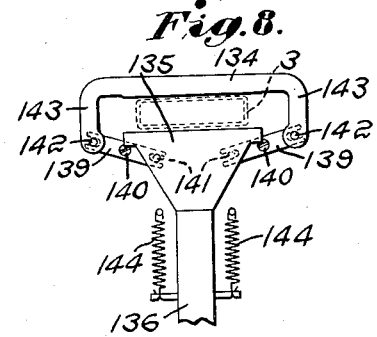
Inventor:
Errold B. Thomas,
by Emery, Booth, Janney & Varney
Attys.

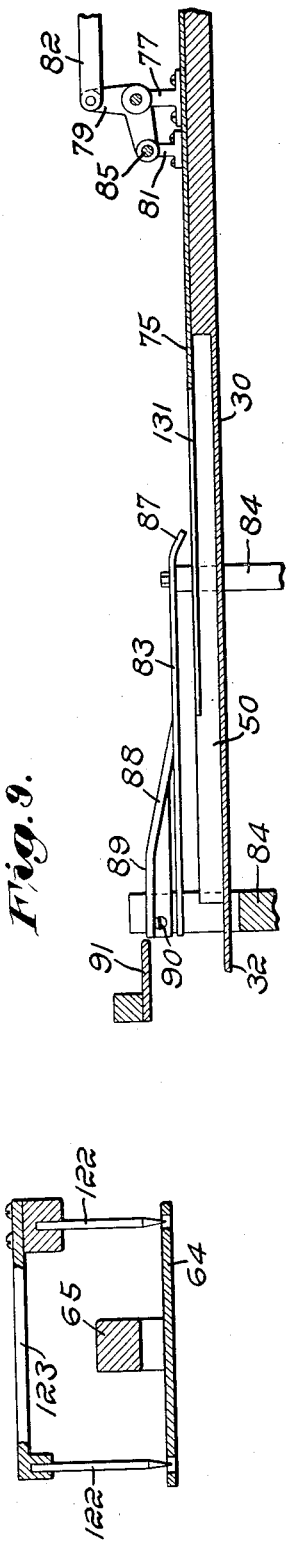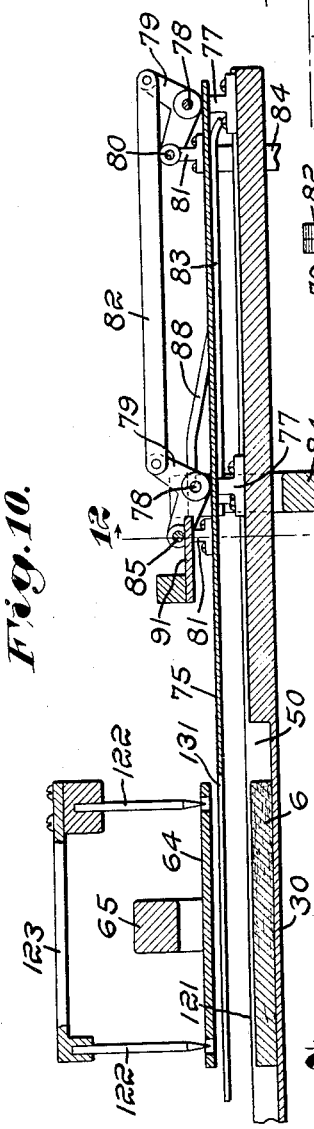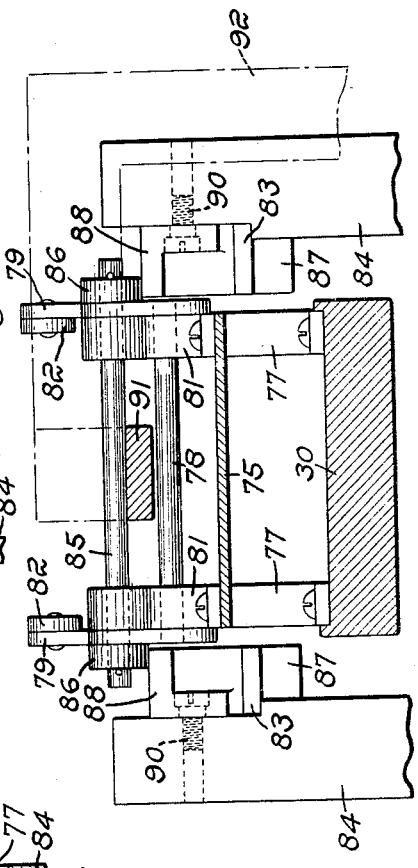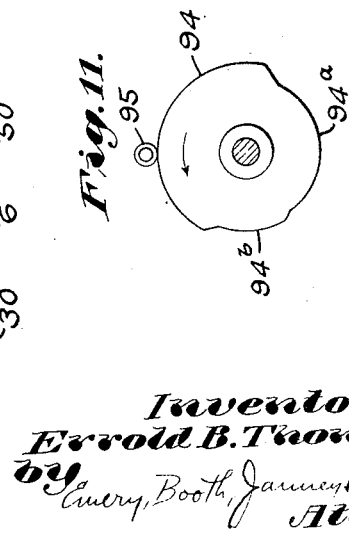

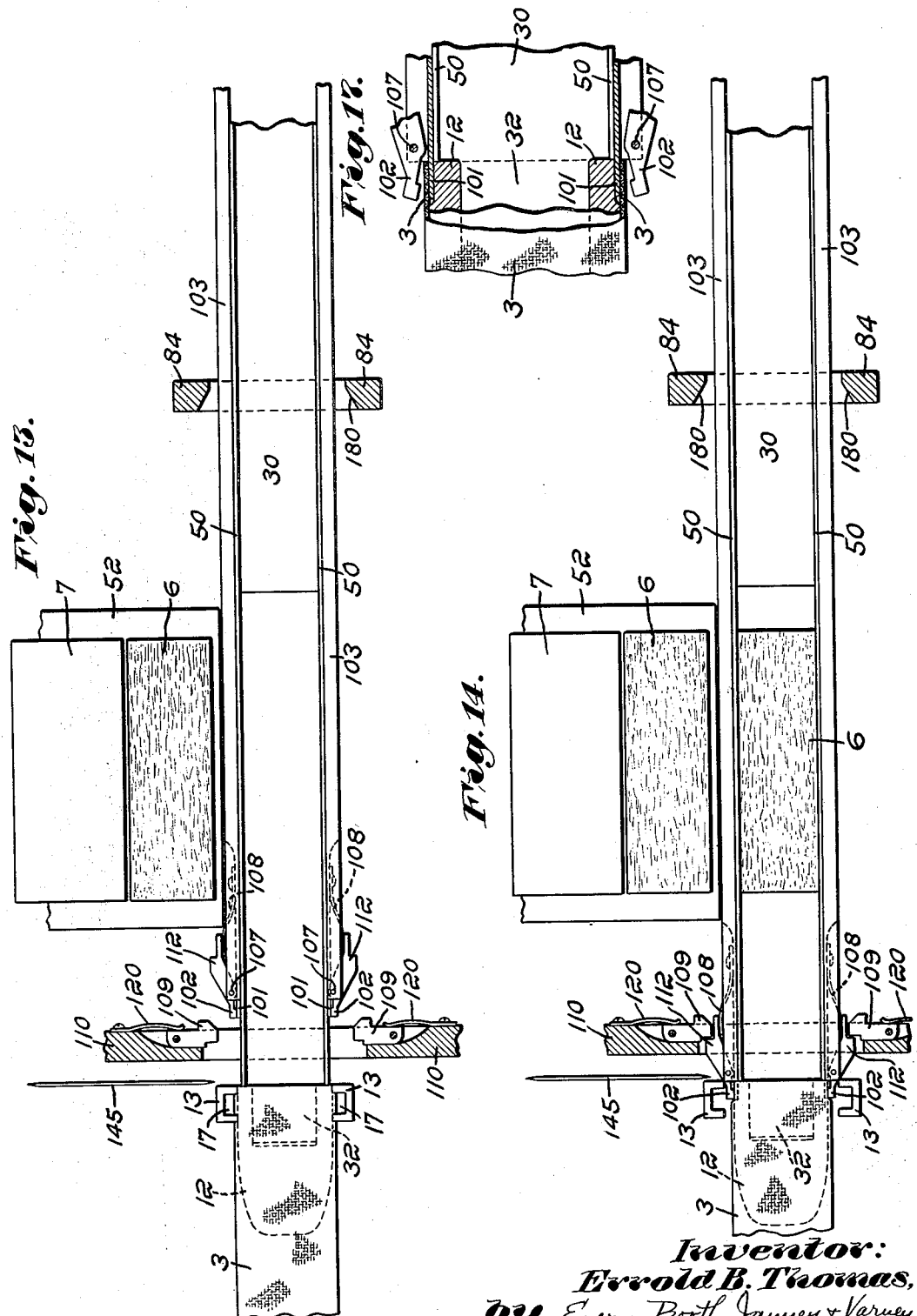

Feb. 6, 1934.  E. B. THOMAS  1,946,298
FILLING MECHANISM AND METHOD
Filed Aug. 7, 1926   6 Sheets-Sheet 6
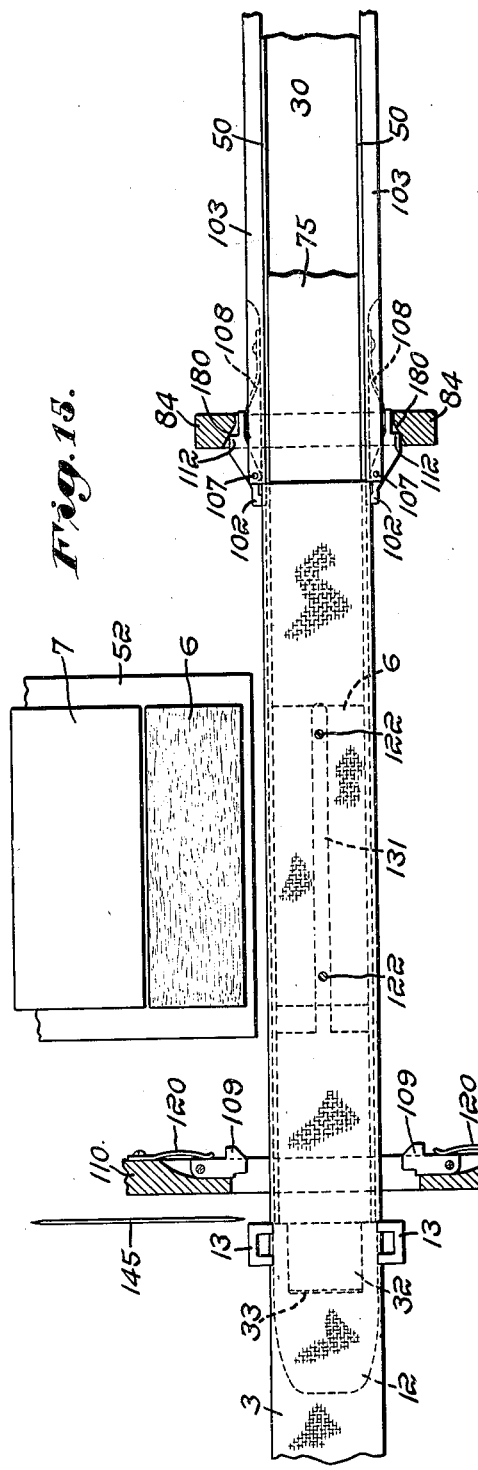
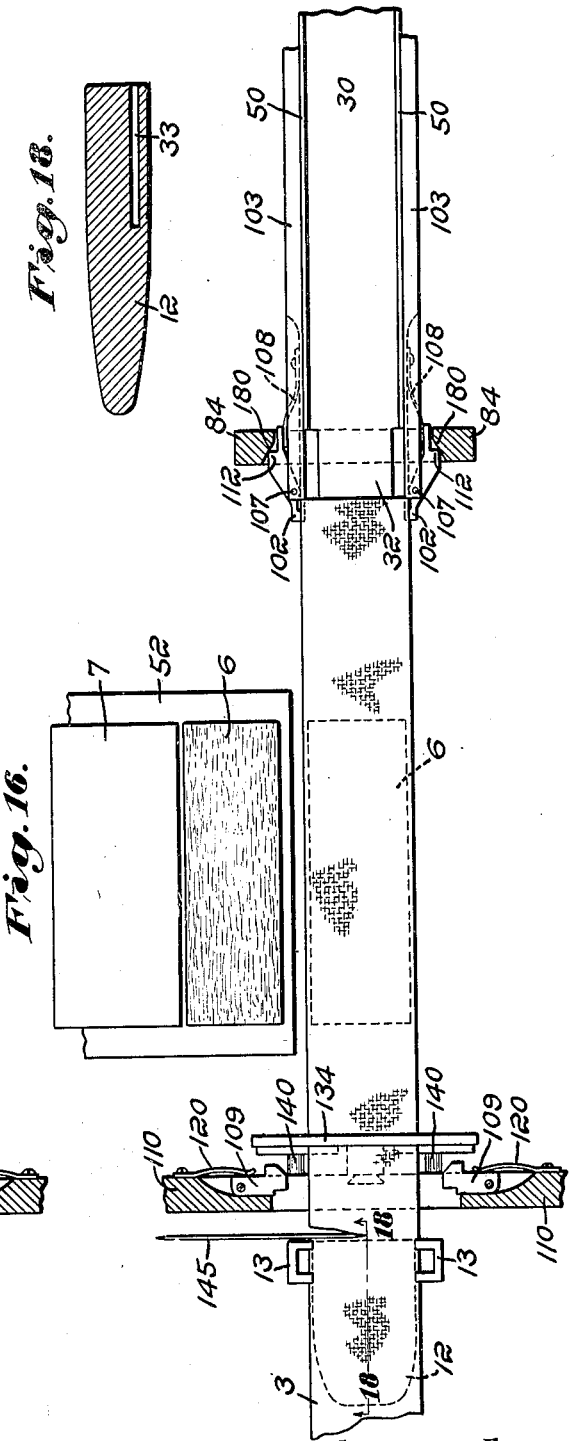
Inventor:
Errold B. Thomas,
by Emery, Booth, Janney & Varney Attys.

Patented Feb. 6, 1934

1,946,298

UNITED STATES PATENT OFFICE 1,946,298

FILLING MECHANISM AND METHOD

Errold B. Thomas, Newton, Mass.

Application August 7, 1926. Serial No. 127,965

44 Claims. (Cl. 223—15)

My invention aims to provide novel and improved mechanism for and methods of assembling filling material with a flexible tubular or substantially tubular envelope or casing, it being particularly applicable to the manufacture of surgical dressings, sanitary napkins, and the like.

In the accompanying drawings illustrating by way of example one embodiment of my invention, and showing one means for practicing the methods thereof:—

Fig. 5 is a vertical transverse section on the line 5—5 of Fig. 1, looking in the direction of the arrows;

Figure 1:
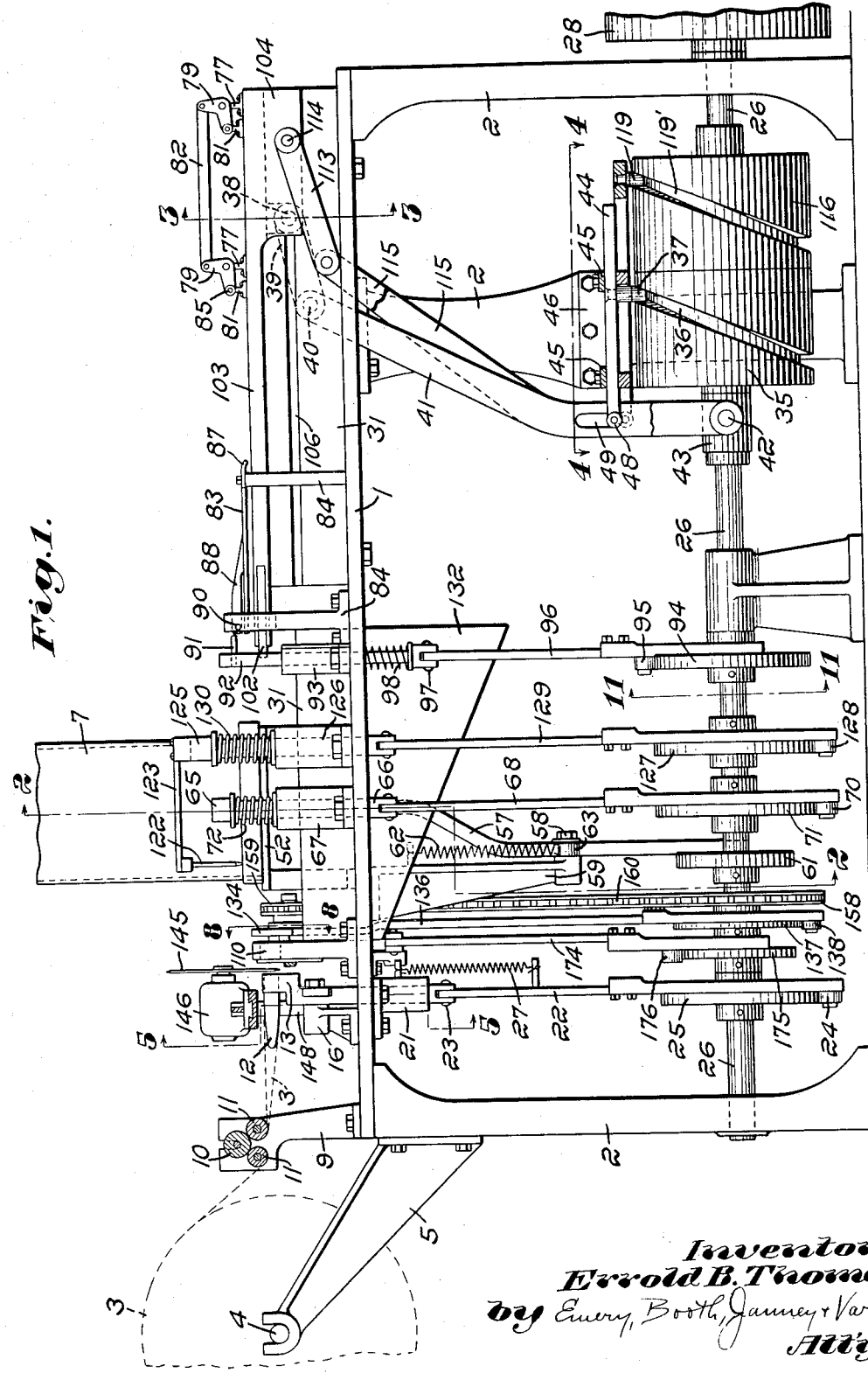
Fig. 1 is a side elevation, with certain portions in vertical section, of a mechanism embodying a form of my invention, the several parts being in their inactive or starting positions.

Figs. 6 and 7 are detail sectional views upon a larger scale taken respectively on the line 6—6 of Fig. 5 and 7—7 of Fig. 6;

Fig. 8 is a vertical sectional view on the line 8—8 of Fig. 1, looking toward the left in said figure;

Figs. 9 and 10 are longitudinal vertical sections taken substantially centrally through the mechanism at the upper right hand portion of Fig. 1 and illustrating two positions of the parts;

Fig. 11 is a vertical section, partly diagrammatic, on the line 11—11 of Fig. 1;

Fig. 12 is a vertical sectional view on a larger scale taken on the line 12—12 of Fig. 10;

Figs. 13, 14, 15 and 16 are partially diagrammatic plan views illustrating successive positions of the filling receiving and envelope-engaging elements, and associated parts;

Figs. 17 and 18 are detail views in horizontal and vertical section respectively and upon a larger scale, of certain of the parts appearing in Figs. 13 to 16, Fig. 18 being taken on the line 18—18 of Fig. 16.

Figure 2:
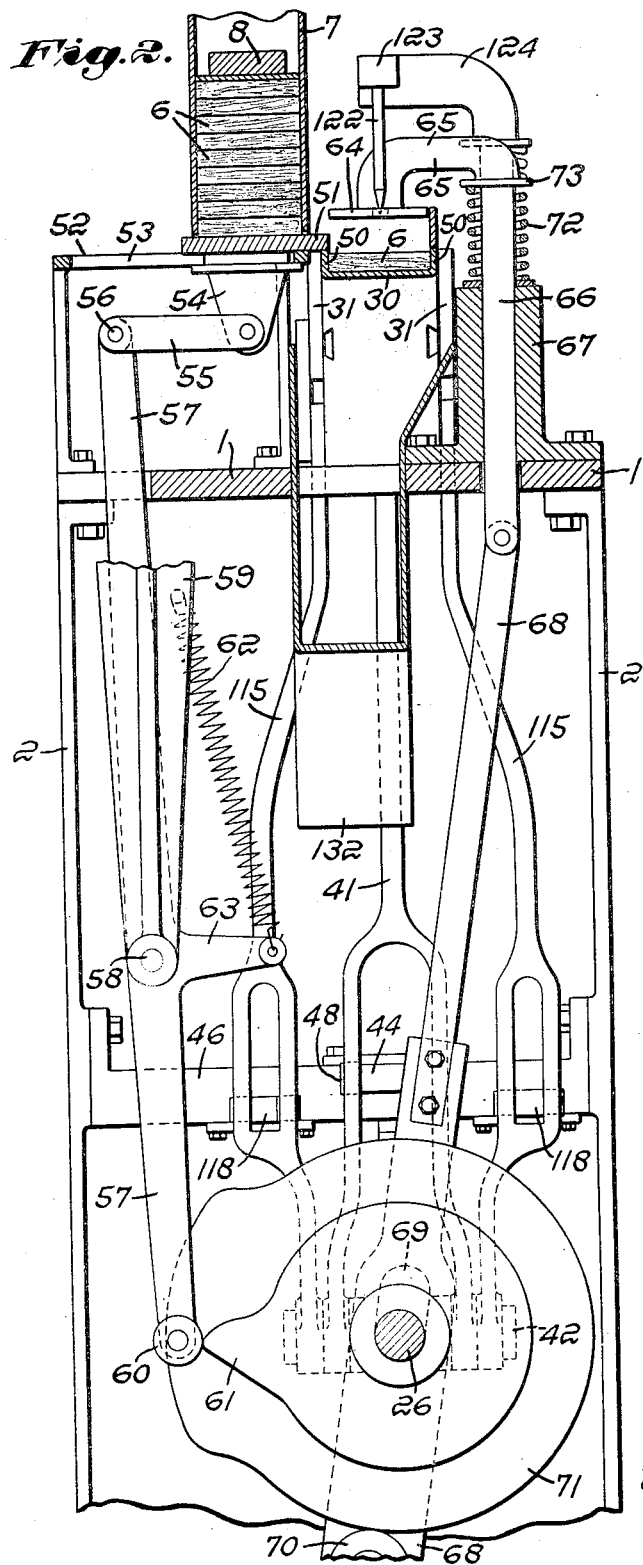
Fig. 2 is a vertical transverse section on the line 2—2 of Fig. 1.

Referring now more particularly to the drawings, and first to Figs. 1 and 2, the illustrative form of mechanism there shown includes a suitable frame herein comprising the platform or table 1 and the supports 2, 2, etc. At or near one end of the machine, the left in Fig. 1, is a supply of flexible casing material 3 which, in the present instance, is a tubular or substantially tubular gauze or other fabric casing or envelope of indefinite length suitably supported in position to be drawn upon, herein in roll form rotatably mounted at 4 upon a bracket 5. In connection with the manufacture of sanitary napkins, bandaging materials, and the like, for which use the disclosed mechanism is particularly adapted, said casing or envelope is desirably formed of a tubular or substantially tubular gauze-like and preferably woven fabric, and while, merely for convenience in description, I will hereinafter at times refer to such casing or envelope as "the gauze", it will be understood that any substantially closed or closable filling-receiving element of any suitable form or material may be employed.

The filling as shown consists of a mass of material capable of formation into filling units, fillers, packages, or pads 6; see Figs. 12 and 13 to 16. Where the mechanism is to be used in the manufacture of hospital dressings, sanitary napkins and the like said filling preferably consists of packages, of the desired dimensions, generally elongated, of absorbent material, such as natural or artificial absorbent cotton, cellulose cotton, or the like. As illustrated, said packages or pads 6 include a plurality of superposed layers of cellulosic material, and may be moisture-proofed on one surface, desirably as disclosed and claimed broadly in my Patent #1,564,498, dated December 8, 1925. Said filling material may be supplied in any suitable manner, as in sheets or strips for division or formation at the machine into packages or units for presentation to the casing. As herein illustrated a supply of such packages or pads is provided at a suitable position upon the machine, where they are stacked, in the present instance, in a magazine or hopper 7 in which they feed downwardly by gravity, means such as the weight 8 being provided, if necessary, to insure proper feeding.

Referring still to Fig. 1, the free end of the casing or envelope 3 is drawn out from the supply, desirably past suitable rolls on a stand 9, whereby sufficient resistance is applied, as by the floating roll 10, to assist in keeping the casing substantially taut and preventing back lash thereof. As shown, said casing passes down and then upwardly around the first of the pair of rolls 11, between it and said floating roll 10, over the latter, and down between said floating roll and the second roll 11.

To that point the casing or gauze is in closed or flattened condition. Suitable means is provided for opening or forming and holding open the free end of said gauze which, as stated, is tubular or substantially tubular in cross section. Accordingly I have shown an opener, former, or spreader element 12 of general duck bill shape, seen upon a larger scale in Fig. 18, and also in Figs. 1, 5 and 13 to 17. Said opener means comprises a tapered block of substantially the longitudinal sectional contour shown in said Fig. 18. As illustrated said opener is freely supported, having no positive connection with other portions of the mechanism, permitting the casing to surround it completely and to be drawn over and past it, suitable means being provided at times to support said opener exteriorly of or through the casing and at other times wholly interiorly of or within the periphery of the open casing.

With the parts positioned as in Fig. 1, said opener 12 is releasably held by a pair of opposed gripping elements best seen in Fig. 5, and also in plan in Figs. 13 to 16. Each such element comprises a gripper or jaw 13 having a boss 14 pivoted upon a stud 15 on a bracket 16 (see Fig. 1). The upper and gripping portions of said jaws are recessed at their inner face, as at 17, 17, for the reception of the casing or gauze-engaging elements later to be described, and accordingly said jaws engage the opener 12 at vertically spaced points, their engaging portions conforming to the shape of the opener so as to hold the same substantially in the horizontal position indicated in Fig. 5.

Said grippers 13, 13 are normally held in opener-supporting position, as shown in Fig. 5, by suitable means, preferably positive in operation. Herein I have provided for the purpose a spreader or wedge 18 between the opposed fingers 19, 19 depending from the respective grippers, and which are yieldably compressed by the spring 20. Said spreader 18 is reciprocable in a guide 21 toward and away from the jaw pivot so as to spread or permit closing together of said fingers, thereby to open or close the gripper jaws at the proper times to release or reengage the opener 12. For actuating said spreader I provide herein a link 22 pivoted thereto at 23, said link having at its lower end, see Fig. 1, a cam roll 24 cooperating with a cam 25 on the main drive shaft 26. The latter extends longitudinally of the machine and has suitable bearings in the end supports 2, 2, if desired, in one or more intermediate stands. A spring 27 connected at its opposite ends to said link and to a stationary part of the machine holds the cam roll and cam in proper engagement. Power may be applied to said main shaft in any suitable manner, as by the pulley 28, at the right in Fig. 1.

When the machine is to be placed in operation, the operator draws the free end of the casing or gauze supply over the opener 12, up to its inner or rear edge, where it will be held by the grippers 13, as shown in Figs. 1 and 13, in readiness to receive the filling material. If desired, suitable manual or foot controllable means may be provided, preferably associated with the spreader 18, for opening or holding open said grippers, as during said setting-up operation.

The filling material is presented by suitable means for reception in the casing or gauze. Herein I employ a reciprocable filling-receiving element, slide, or tray 30, mounted for movement toward and away from the casing supply. Extending longitudinally of the table 1 is a pair of rails 31, Figs. 1, 2 and 3, upon which said tray is slidable, cooperating longitudinal rib and groove or like guide formations being provided on said tray and rails, as indicated in Fig. 3.

In Fig. 1 the filling-receiving tray is in its rearward or normal, inactive position, that is, at the right in said figure. As the first step in the sequence of operations said tray is moved forwardly, toward the left in Fig. 1, into the position shown in Fig. 13. Said tray has formed at its forward or free end a tongue 32 adapted to project into a recess 33 formed in the opener 12 (see particularly Fig. 18) whereby the latter will be supported interiorly of or within the periphery of the open casing when the grippers 13 are released.

The tray 30 is actuated in any suitable manner, herein by cam and lever connections with the main shaft 26. Referring to Fig. 1, said shaft carries near one end, at the right in said figure, a cylinder cam 35 having a peripheral cam path 36 and cooperating cam roll 37. Said tray has connected to it at 38, Fig. 3, a link 39, seen in Fig. 1, which in turn is pivoted at 40 to the upper end of a lever 41 (see also Fig. 2) having a forked lower end rockable on a stud 42 projecting from a collar 43 loose upon but supported by the main shaft 26. Said lever 41 is operatively connected with said cam roll 37 as by means of the slide 44 (see also Fig. 4) moving in guides 45, 45 on a shelf 46 extending crosswise the machine between the intermediate uprights or supports 2, 2. Said cam roll 37 is carried by said slide, which latter is provided at its opposite or inner end with a connecting pin 48 received in slots 49 in the forked portion of the lever 41. Through said connections motion is transmitted positively from the cam to the tray to move the latter forward and back at the desired times.

Figure 3:
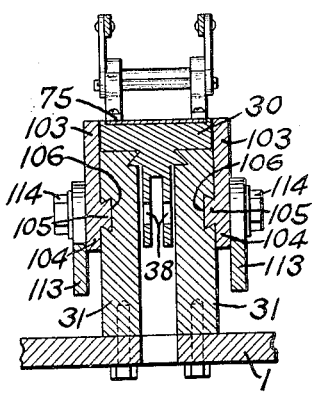
Fig. 3 is a like section on the line 3—3 of Fig. 1.
Figure 4:
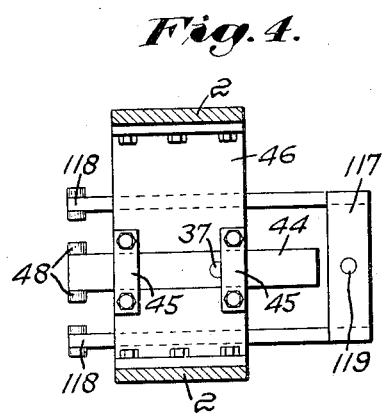
Fig. 4 is a view partly in plan and partly in horizontal section upon the line 4—4 of Fig. 1.

Said filling-receiving tray 30 includes a rear portion, seen in section in Figs. 3, 9 and 10, for cooperation with the rails 31, 31 and a forward portion or tray proper including side walls 50, 50 spaced to correspond to the width of the filling mass, package or pad to be handled. When the tray has gone forward the latter is automatically placed in it at the desired position, as by the mechanism best seen in Fig. 2.

Referring to the upper portion of said Fig. 2, a pad-inserting member or pusher 51 is mounted for movement transversely of the hopper 7 so as to engage the lowermost pad of the stack and transfer it to the waiting tray 30. As shown in said figure, a pad has just been positioned and said pusher 51 is still in its advanced position, that is, toward the right in said figure. Said pusher or filling-positioning member is slidable across the hopper floor 52 outwardly, to the left, sufficiently to permit the stack of pads to drop onto said floor. The latter is provided with a slot 53 through which projects a lug 54 depending from the pusher 51 and pivoted to a link 55 in turn pivotally connected at 56 to the upper end of a lever 57 rockable at 58 on a bracket 59 secured to the machine frame. At its lower end said lever 57 carries a cam roll 60 cooperating with a cam 61 on the drive shaft 26. Said cam preferably has a relatively steep rise portion giving a quick, positive movement to the filling-presenting member. Said cam roll 60 is held in engagement with its cam as by means of the spring 62 secured at one end to said bracket 59 and at its opposite end to an arm 63 projecting laterally from the lever.

As the filling material is generally of extremely light weight I desirably provide means to insure the proper seating of a unit, package or pad thereof in the tray. For this purpose I have shown a depresser element, also best seen in Fig. 2. It includes a plate or foot 64, having a width approximately that of the tray 30 between its side walls 50, 50, and vertically movable to press the pad well down into the tray. Said depresser is carried by a gooseneck 65 secured to the upper end of a lifter rod 66 vertically reciprocable in a post 67 on the machine platform. Said lifter rod and attached depresser plate are also preferably operated from the main drive shaft by any suitable connections, such as the lever 68 connected at its upper end to said rod 66 and slotted at an intermediate portion, as at 69 to straddle the drive shaft and having at its lower end a cam roll 70 making contact with a cam 71 fast on said shaft. The depresser plate 64, rod 66, and lever 68 are normally held in raised position as by the coil spring 72 intermediate the upper face of said post 67 and a flange 73 on the rod 66.

In some instances said depresser plate may operate directly upon the pad but in the form illustrated I have provided a pad cover plate 75 which, at the time the pad is to be depressed, lies on the pad between it and the depresser, which descends onto said cover plate. The latter is mounted for movement forward and back with the pad tray but has also an up and down movement relative to the tray so that it may be lifted to provide ample space between it and the tray for the insertion of a pad from the hopper. Said pad cover plate and operating mechanism are seen in Fig. 1 and in more detail in Figs. 9 to 12.

Referring to said figures, said cover element comprises the elongated thin plate 75, formed separately from the tray 30. At longitudinally spaced points on said tray are posts 77, 77 arranged in pairs at opposite sides of the cover plate. A pin 78, 78 is journalled in each pair of said posts, each having fast at its opposite ends bell cranks 79, 79. Each bell crank, of which there are four in the illustrated mechanism, has one arm, that toward the left in the drawings, pivoted at 80, 80, etc. at the upper end of one of a like number of stands 81 secured to the upper face of the cover plate 75, and arranged similarly to the posts 77, 77, etc. on the tray. Said bell cranks 79 of the front and rear pairs and on the same side of the cover plate have their other or right hand arms connected by the parallel links 82. The described connections constitute a system of parallel linkage such that vertical movement given to the forward or left hand arms of one pair of bell cranks will be communicated to the other pair, whereby the cover plate will be lifted in horizontal position out of engagement with the tray 30, as shown in Fig. 10, or allowed to move down into engagement with it, as in Figs. 9 and 15.

As the tray 30 moves forward, that is, to the left in the figures, in readiness to receive a mass of filling material, the cover plate 75, being connected to it through the posts 77 and linkage above described will travel with the tray. At some time prior to the arrival of the cover plate opposite the hopper 7 it is lifted away from the tray by suitable automatic means, best seen in Figs. 1, 9, 10 and 12. In said figures I have shown a pair of tracks 83 at opposite sides of the tray and cover plate and supported from the machine table in any suitable manner, as by the brackets 84, 84. The pivotal connection 80 for the forward or left hand arms of the forward pair of bell cranks 79, 79 comprises a cross shaft 85 projecting laterally beyond said bell cranks and having at its opposite ends the rolls 86, 86 for cooperation with said track 83. The latter is formed with an inclined portion 87 at its rear or right hand end.

During forward movement of the cover plate and tray said rolls 86 will ride up said incline 87 and onto the tracks 83, thus lifting the forward arms of the bell cranks and raising the cover plate to a corresponding extent. As the tray and plate continue their forward movement said rolls 86 move onto cams 88 having each a rearwardly inclined portion and a flat portion 89, said cams being pivoted at 90 upon the forward pair of brackets 84. It will be understood that there are two cams 89, one for each track, at opposite sides of the tray. When the rolls 86 are resting on said horizontal portions of the cams 88 the cover plate is in its position of maximum elevation.

As the tray and cover plate continue still further forward, still toward the left in the figures, the rolls 86 ride off from their cams 88 completely, their shaft 85 being then received on a flat finger or cover plate lifter 91 which at that time is held at the proper level to receive the shaft. When said shaft is resting on said finger 91 the vertical position of the cover plate relative to the tray is then controlled by said finger, which latter is mounted for vertical reciprocation to permit the subsequent lowering of the cover plate and still later a partial lifting of the same for a purpose to be explained hereinafter.

Said finger 91 is carried by a rod 92 slidable in a post 93 in a manner similar to the operating rod 65 of the filling depresser, previously described, and is arranged for actuation from the drive shaft 26 through the cam 94, cam roll 95 and connecting lever 96 pivoted at 97 to said rod 92. A spring 98 is provided, which tends normally to hold the rod and finger 91 in depressed position.

As the tray and cover plate go forward, to the left in the figures, the cover plate is lifted away from the tray by the track and cam means described and the shaft 85 during the continued forward movement rides over onto the lifter finger 91. At that time the tray and cover plate have substantially reached their full forward positions, the tongue 32 at the forward end of the tray entering the recess in the former 12 so as to hold the same when released by the grippers 13. The cover plate is somewhat shorter than the tray, so that in its forward position it terminates approximately opposite the forward or left hand end of the filling hopper 7, as indicated by the dotted lines in Fig. 15.

While the tray and cover plate are forward, but with the cover plate still elevated, a filler or pad is pushed over onto the tray by the means previously described. The cover lifter 91 then falls, permitting the cover plate to drop into contact with the tray and pad. This is effected by the movement of the cam roll 95, see Fig. 11, off from the high portion of the cam 94 and onto the low portion 94a. Said low portion is preferably formed to permit the plate lifter 91 to descend slightly below the position in which the cover plate comes into contact with the pad then positioned in the tray, so that the weight of the plate is taken entirely off the lifter. Thereafter the filling or pad seating element or depresser 64 comes down onto the top of the cover plate, and through the latter acts upon the pad to bring it to a certain and proper seat in the tray. Having thus effected the full seating of the filling pad said depresser 64 is shortly thereafter again raised out of contact with the cover plate, the cam 71 controlling said mechanism being formed to effect the described movements at the times desired. The pad is then in position to receive its containing envelope or gauze, the pad tray being forward and supporting the gauze opener 12, so that the latter may be released by its grippers 13.

Suitable means is provided to effect a relative movement of the package or pad of filling material and the gauze so as to bring the pad into the desired position longitudinally of and within a section of the gauze of the proper length. In the illustrated form of the invention I have provided for this purpose a pair of casing or gauze-engaging elements, nippers or jaws which are adapted to seize the forward portion of the gauze and draw the latter out from its supply, back over and enclosing the pad.

Said nippers herein are positioned at opposite sides of the pad tray, and each has an inner jaw 101 adapted to be projected inside of the gauze, and a cooperating outer and relatively movable jaw 102 for engagement over the outer surface of the gauze. Said nippers are mounted for movement toward and away from the gauze supply over a path of a length, which may be adjustable, sufficient to enable them to draw out the desired length of gauze to constitute the envelope or holder for each individual article, such as a sanitary napkin. Herein said nippers are each held by a nipper bar or arm 103, 103 which are slidable in parallelism with the pad tray. Said nipper bars at their rear ends, at the right in the figures, have enlarged portions 104, 104, see Figs. 1 and 3, provided at their inner faces with ribs 105 slidable in guideways 106, 106 in the rails 31, 31 previously referred to and along the top of which the pad tray is movable.

The outer jaws 102 of the nippers are pivoted, as at 107, at the forward end of the respective nipper bar and are normally held in gripping engagement with the inner jaws as by means of the leaf springs 108 on the respective bars. The nose portions of said jaws are shaped to permit them to be projected forwardly sufficiently to seize the gauze while the latter is still held by the grippers 13, the latter being formed for this purpose with the recesses 17, 17 (see Fig. 5), previously referred to.

As the nippers 101, 102 approach the gauze they are each opened at the proper time by suitable means, herein illustrated as pivoted cams or trips 109, 109 on a cross piece 110 secured to the platform of the machine. Said cams each have a rearwardly disposed cam face with which a cam surface on each of the outer nipper jaws engages as the latter come opposite the cams. The nipper jaws are held open long enough to permit them to pass well over onto the edge of the gauze, when they snap shut and seize upon the gauze, their rear ends riding out from under the cams 109. The relative positions of the parts under consideration at the time the nipper jaws are about to seize upon the gauze is clearly shown upon a somewhat larger scale in Fig. 17.

The gauze nippers, carried by their bars 103, are slidable independently of the pad tray, but preferably are travelling forward into gauze-seizing position during movement of but slightly to the rear of the pad tray, the movements of said parts being so timed that the tray has assumed its full forward position, as clearly indicated in Fig. 13, before the nippers seize upon the gauze. Said nipper bars 103 receive their reciprocating movement from suitable mechanism, in the present instance substantially similar to that already described for the pad tray. Referring to Figs. 1 and 2, said means herein includes, for each nipper bar 103, a link 113 pivotally connected at 114 to the rear portion 104 of the respective nipper bar. The opposite ends of said links 113 are respectively pivotally attached to levers 115, 115—see particularly Fig. 2—having collars at their lower ends whereby said levers are supported for rocking movement upon the same stud 42 with the pad tray operating lever 41 previously described. Said levers 115, 115 are actuated simultaneously through connections with a cylinder cam 116 on the drive shaft similar to the cylinder cam 35, said connections including a yoke-shaped slide 117, supported by the shelf 46. The forward ends of the yoke arms 118, 118 are pivotally connected with the respective levers 115, 115, the latter being slotted to prevent interference with the yoke arms during movement of the levers. At its rear end the cross portion of said yoke slide carries a cam roll 119 cooperating with a peripheral cam path 119' in said cylinder cam 116.

After the pad tray has gone forward, the pad been positioned, and the nippers have seized upon the forward edge of the gauze, the grippers 13, 13 are released, as shown in Fig. 14, and the mechanism is in readiness for drawing the gauze rearwardly over the pad. The pad tray is still retained in its forward position, while the nippers now travel rearwardly, to the right in the figures, drawing out the gauze with them. The nipper jaws 102 have each a shoulder 112 which during the first part of the rear travel of the nippers come into contact with the forward inner faces of the cams 109, substantially as shown in Fig. 14. Said cams, being pivotally and yieldably supported, are swung rearwardly and outwardly by the nipper jaws and against the tension of their springs 120, 120, snapping back into their normal position as the nipper jaws pass rearwardly beyond them. It will be observed, particularly from Fig. 14, that the nipper jaws 102 are so proportioned and pivoted at such point that their engagement with said cams 109 during the rearward travel of the nipper bars does not disturb the grip of the jaws on the gauze but tends rather to tighten the same.

As the nippers move rearwardly the casing or gauze is drawn out over the tray having the filling positioned in it, the free end of the gauze being carried on beyond the filling to any desired extent. To insure against interference between the filling package or pad and the free edge of the gauze as the latter is drawn on, the pad tray may be formed with slightly raised portions 121, see Fig. 10, on its sides 50, 50 adjacent the positioned pad and extending beyond the latter at its opposite ends just sufficiently to effect a slight further opening of the tubular gauze as it comes over the pad and during its passage by it.

The nippers continue rearwardly, to the right, into substantially the position shown in Figs. 15 and 16, in which figures they still have hold upon the gauze, while the pad tray still remains forward. The latter may now be withdrawn, leaving the pad within the drawn-out length of gauze or casing. If desired, means is provided to prevent relative movement of the pad and gauze while the pad tray is being withdrawn, and for this purpose I have shown a pad-retaining mechanism comprising one or more pad piercing elements or needles 122, 122 adapted to pass through the gauze and engage the pad enclosed by it.

As best seen in Figs. 1, 2, 9 and 10, the said needles are carried by a frame 123 secured to an arm 124 at the upper end of a rod 125 vertically reciprocable in a post 126 on the machine frame and actuated through suitable cam mechanism in a manner substantially similar to that of the pad depressor 63 previously described. Said connections, as seen in Fig. 1, include a cam 127 on the main shaft 26, cooperating cam roll 128, and connecting rod 129 pivoted at the lower end of said rod 125. A spring 130 intermediate the post 126 and a collar on said rod 125 holds said rod and the pad-holding needles normally in elevated position, as in Fig. 1. Said cam 127 is shaped and timed to lower the needles into engagement with the pad after the gauze has been drawn over it and prior to the removal of the tray. The pad depressor 64 has suitable openings opposite the needles to permit their passage through it, see Figs. 2, 9 and 10, while the cover plate 75 is centrally and longitudinally slotted at its forward end as at 131, Figs. 10 and 15, for a similar reason and also to permit the cover plate to be withdrawn rearwardly while the needles are still holding the pad.

Just prior to the withdrawal of the pad tray the cover plate 76 is desirably lifted a short distance, sufficient to take its weight off from the pad. This is accomplished by the finger 91 through the cam roll 95, which at this time rides onto the cam portion 94b, see Fig. 11, of intermediate height and on which it dwells while the pad and cover plate are being withdrawn. Also by this slight raising of the cover plate the rolls 86 are brought up onto a level with the tracks 83, 83, and beneath the cams 89, 89. During the subsequent withdrawal of the tray and cover plate said rolls move onto said tracks and rearwardly therealong, lifting the cams 89, 89, which drop back onto the tracks as the rolls pass out from under them.

While the filling is thus retained in proper longitudinal position the tray and cover plate are withdrawn to a position clear of the casing or gauze, as shown in Fig. 16. The nippers still retain their hold upon the gauze, so that a section thereof extends across between the gauze opener 12, where it is held by the grippers 13, 13, and the rearwardly positioned nippers 101, 102, the filler or pad being positioned at the proper point within said drawn-out gauze section. The pad-holding needles 122 may be, and preferably are, then withdrawn, through their cam control.

It then remains only to sever the gauze section from its supply, and to release it whereupon the complete article will drop into any suitable receiver such as the chute 132, which may conduct it onto an endless belt for conveyance to the packaging point, or any other suitable disposal of the finished article may be made.

While in most instances the casing or gauze and contained filling will be properly held in the described extended position by the nippers, in readiness for cutting off, additional casing or gauze supporting means may be employed, if desired. In the figures I have illustrated such means as consisting of a pair of opposed clamping members 134, 135, seen in detail in Fig. 8, and also appearing in Figs. 1 and 16. Said members are adapted to be compacted, moving oppositely towards each other, so as to seize upon the gauze tube preferably at a position closely adjacent the point at which it is to be severed.

Said clamping members may be operated in any suitable manner to grip the gauze after the latter has been drawn out to the full extent required. The lower clamping member 135 is carried at the upper end of a rod 136 which is vertically movable by the cam 137 on the drive shaft and the cooperating cam roll 138 at the lower end of said rod. The upper clamping member is connected to said lower member for simultaneous but opposite movement. Such connections include a rock member 139 at opposite sides of the lower clamp 135 and having fixed pivots 140, 140 on the cross piece 110 which carries the nipper-opening cams 109. Each of said rock members has pivoted and sliding engagement at one end with the lower clamp 135, as at 141, and a similar engagement at its opposite end, as at 142, with the depending portions 143, 143 of the upper clamp. In this manner vertical movement of the lower clamp will be transmitted to the upper clamp, but in an opposite direction. The rod 136 is normally held down by its cam roll and cam 137, against the tension of suitable spring means 144, 144, the clamp being then in open position. At the proper time said cam roll rides into a depression in the cam 137, permitting the rod 136 and lower clamp 135 to be lifted by said spring means, and thus bringing the clamping members together upon the gauze.

Any suitable severing means, preferably automatic, may be employed for cutting off the drawn out casing or gauze, or the desired portion thereof containing the filling, from its supply. For this purpose I have found a rotary saw or cutter to be especially adapted. Referring to Figs. 1, 5, 6 and 7, a rotary cutter or saw 145, desirably thin and having a razor edge, is mounted on the rotor of an electric motor 146 receiving its energy from any suitable source.

Said motor is slidably supported for traverse crosswise of the gauze to sever the same at the proper time, and is accordingly mounted on a track 147 bridging the gauze and supported from the machine table as by the uprights 148, 148. Traversing movement is given to the motor by means of a link 149 connected at one end to the motor and at its other end pivoted, as at 150, to the upper end of a rock lever 151 having a fixed pivot 152 at its opposite and lower end upon the machine frame or table, and swinging in a guide 151a. At a suitable intermediate point there is pivotally attached to said lever 151 a pitman 153 having at its opposite end a crank connection, as at 154, with a crank disk 155 fast upon a shaft 156 rotatable in bearings at the upper end of a bracket 157 secured to the machine frame. It will be understood that a single rotation of said crank disk 155, starting from the position shown in Fig. 5, will effect a traversing movement of the motor and cutter across the casing or gauze, toward the right in said figure, and a return to the position illustrated. If desired, the starting and completion of the traverse of the cutter may effect automatically a closing and breaking respectively of the electrical circuit for the motor, or the latter may be run continuously during operation of the machine. Preferably also the cutter and the connections for traversing same are constructed and arranged to permit a manual traversing movement thereof by the operative, independently of the remainder of the machine, to trim the leading edge of the gauze when setting up the machine, or at other times.

For traversing the cutter, power is taken from the main shaft 26, preferably through a relatively large sprocket wheel 158 (Fig. 1) fast on the shaft and drivingly connected with a smaller like wheel or gear 159 by the sprocket chain 160. Said upper and smaller sprocket 159, which is loose upon the shaft 156, is adapted for operative connection with the crank disk 155 but is normally disconnected therefrom so that the motor and cutter may remain at rest during the major portion of an operating cycle of the machine.

In order drivingly to connect said gear 159 with the crank disk, the gear is formed on its inner face with a plurality of radial clutch elements or teeth 161, Fig. 6. In axial alignment with said gear is a hub 162 fast on the shaft 156 and carrying a spring-pressed plunger 163 adapted to engage with any one of said clutch elements to cause the shaft 156 and parts attached to it to rotate with the loose gear 159. The spring 164 of said plunger acts to force the latter into clutching position, but said plunger is normally held out of engagement by a finger 165 pivoted at one end, as at 166, upon a lateral projection of the bracket 157, and having its other end normally between the head 167 of the plunger and the adjacent face of the hub 162, thus holding the plunger out of clutch engagement with the gear.

Said finger is withdrawn at the proper time to release the plunger and allow it to engage the rotating gear 159, whereby the shaft 156 and crank disk 155 will be rotated to effect the traversing movement of the cutter. Said finger 165 is therefore pivoted near its free end, as at 168, to an operating rod 169 in turn pivoted at 170, see Fig. 5, to one arm of a rocker 171 on a lug 172 supported from the machine table. The other arm of said rocker is pivotally connected at 173 to the upper end of a link 174 actuatable in a vertical direction by a cam 175 on the main shaft cooperating with a cam roll 176 at the lower end of said link. The rod 169 is normally held up and its cam roll kept in contact with the cam as by the spring 177 bearing at its opposite ends on the machine platform and against a collar on the rod.

At the free end of said finger 165 is an inclined cam 178, Fig. 7, which lies in the path of the plunger head 167. When connection is to be made with the clutch-carrying gear 159 to traverse the cutter, the finger 165 is drawn down and then quickly released for return to its position in the path of the plunger head, as shown in Fig. 7, the finger controlling cam 175 having for this purpose a short and steep rise portion. As the hub 162 is driven around in a counterclockwise direction, viewing Fig. 7, the plunger head 167, just before a full rotation of the hub takes place, will ride up the cam 178, thus withdrawing the plunger and unclutching the hub and crank disk 155 from the gear 159. To prevent overrunning of the hub and crank disk, a stop 179 carried by the finger 165 is positioned in the path of the plunger head.

In Fig. 16 the cutter 145 is shown in active position effecting severance of the casing or gauze. From said figure it will be apparent that the auxiliary gauze clamps 134, 135, in addition to assisting in holding the gauze in firm position for cutting, make it possible to cut off short lengths of gauze, such as may occasionally be left should the nippers fail to draw out a full length, due to imperfection in the gauze material, or other cause. This makes it unnecessary to stop the machine at such time, as any short length of gauze will automatically be cleared from the path of the nippers.

Upon completion of the severing operation, both the auxiliary clamping members 134, 135 and the gauze nippers 101, 102 are opened, so that the severed length of gauze with contained filling is freed for discharge from the machine. The final or releasing opening of said nippers is effected through a slight final rearward movement of the nipper bars 103, produced by an appropriate formation in the cam path 119'. By said movement the shoulders 112 of the nipper jaws 102 are brought sharply back against the abutments 180, 180 properly positioned for this purpose in the path of the respective nippers. Said abutments may be formed on the uprights 84, 84 which carry the cover plate cams 89 previously described.

From the foregoing it will be understood that my invention includes the steps of supporting a supply of casing or envelope material in position to be drawn upon, opening the mouth thereof, presenting a mass of filling material, effecting placement of the filling in the casing by relative movement of said materials, and severing a length of casing containing the filling, or any of said steps.

My invention is not limited to the particular embodiment thereof herein illustrated and described nor to the particular methods herein disclosed, its scope being pointed out in the following claims.

I claim:

1. An organized machine for placing filling material in an elongated, flexible casing, comprising a reciprocable tray-like element, means for selecting a quantity of filling material from a supply and positioning the same on said tray-like element, means to engage and draw the casing about said element and positioned filling, and means to withdraw said element while retaining the filling in the casing.

2. An organized machine for forming surgical dressings, sanitary napkins and the like comprising, in combination, a slide movable toward and from a fabric casing supply and adapted to hold a mass of filling material, means to position said mass thereon, a casing opener, means to support the same within the periphery of the opened casing, reciprocable gripper-carrying elements to seize the opened casing and draw it out about said slide and filling material held thereby, means to retract said slide while retaining the filling material in the drawn-out casing, means to sever the casing in the rear of the filling material, said gripper-carrying elements retaining their hold on the casing during the severing operation, clamping means to hold the casing adjacent the point of severance, and means to release said gripper and said clamping means to discharge the severed length of casing with contained filling material.

3. An organized machine for forming surgical dressings, sanitary napkins and the like comprising, in combination, a slide movable toward and from a fabric casing supply and adapted to hold a mass of filling material, means to position said mass thereon, a casing opener, means to support the same within the periphery of the opened casing, reciprocable gripper-carrying elements to seize the opened casing and draw it out about said slide and filling material held thereby, means to retract said slide while retaining the filling material in the drawn-out casing, and means to sever the casing in the rear of the filling material.

4. An organized machine for forming surgical dressings, sanitary napkins and the like comprising, in combination, a slide movable toward and from a fabric casing supply and adapted to hold a mass of filling material, means to position said mass thereon, a casing opener, means to support the same within the periphery of the opened casing, reciprocable gripper carrying elements to seize the opened casing and draw it out about said slide and filling material held thereby, and means to retract said slide while retaining the filling material in the drawn-out casing.

5. An organized machine for forming surgical dressings, sanitary napkins and the like comprising, in combination, a support for a supply of substantially tubular casing, means for supporting a supply of filling material, means to select a mass of said material suitable for reception in said casing, means to hold said selected mass, mechanism to engage said casing and draw it about said filling mass while so held, means thereafter to free said mass from said holding means, and means to cut off a length of the casing containing said filling mass.

6. Mechanism for placing filling material in a substantially tubular fabric envelope adapted to be supplied in indefinite length, comprising, in combination, a frame, an opener over which the fabric may be drawn, a reciprocable tray, means to advance said tray to bring its forward end adjacent said opener, means to position the filling material in said tray, a reciprocable fabric engaging element, means to advance the latter into engagement with the fabric and to retract it so as to draw the fabric out over the tray and filling material therein, means to retract the tray from the drawn-out fabric but leaving the filling material therein, and means to sever the fabric.

7. Mechanism for placing filling material in a substantially tubular fabric envelope comprising in combination filling-presenting means adapted to be received within the fabric, means to load said presenting means with filling, mechanism to draw out the fabric about the loaded filling presenting means, and means to withdraw the filling presenting means from the fabric.

8. Mechanism for placing absorbent filling material in a substantially tubular fabric envelope, in the manufacture of sanitary napkins, said mechanism comprising in combination a support for a supply of substantially tubular fabric, of indefinite length, and in closed condition, to be drawn upon, means to position an absorbent filling mass, opening means for presenting the leading end of said tubular fabric in normal-opened condition while avoiding lateral stretching thereof, and means to move the fabric in said normal-opened condition relatively to the positioned absorbent filling mass thereby to enclose the latter in said normally opened tubular fabric.

9. Mechanism for forming surgical dressings, sanitary napkins and the like comprising, in combination, a support for a supply of substantially tubular gauze of indefinite length, a magazine for absorbent filling packages, a reciprocable tray, tray operating means to advance and retract the same, means to position a filling package thereon, gauze-engaging mechanism movable in parallelism with said tray, operating means to advance said gauze-engaging mechanism into engagement with the forward portion of the gauze and to retract the same to draw the gauze about said tray and the filling package positioned thereon, and means to cut off the gauze containing the filling package.

10. Mechanism for forming surgical dressings, sanitary napkins and the like comprising, in combination, a support for a supply of substantially tubular gauze of indefinite length, a magazine for absorbent filling packages, a reciprocable tray, tray operating means to advance and retract the same, means to position a filling package thereon, gauze-engaging mechanism movable in parallelism with said tray, and operating means to advance said gauze-engaging mechanism into engagement with the forward portion of the gauze, and to retract the same to draw the gauze about said tray and the filling package positioned thereon.

11. In mechanism of the class described, means to support a supply of fabric casing in position to be drawn upon, a casing opening element, releasable means to support said element by engagement exteriorly therewith, a filling presenting tray movable toward and away from said opening element, and means to draw the casing about the tray, said tray having a tongue at its forward end to engage and support said opening element during the drawing out of the casing.

12. In mechanism of the class described, means to support a supply of fabric casing in position to be drawn upon, a casing opening element, releasable means to support said element exteriorly, and other means to support said element by engagement therewith wholly within the periphery of the casing, said last mentioned means being carried by a filling positioning device adapted to receive said casing about it.

13. In mechanism of the class described, means to support a supply of fabric casing in position to be drawn upon, a casing opening element, releasable means to support said element exteriorly thereof and adapted to permit passage of the casing between it and said element, and other means to support said element by engagement therewith wholly within the periphery of the casing.

14. In mechanism of the class described, means to support a supply of fabric casing in position to be drawn upon, a casing opening element, and laterally opposed means supporting said element exteriorly, said means being adapted to retain the free end of the casing against back lash or unintentional retraction from about said element.

15. In mechanism of the class described, means to support a supply of fabric casing in position to be drawn upon, a casing opening element, and separable engaging means at the sides of said element freely supporting the latter in the path of the casing.

16. In mechanism of the class described, means to support a supply of fabric casing in position to be drawn upon, a casing opener, and means to support the latter at times exteriorly of the casing and at times wholly interiorly thereof.

17. In mechanism of the class described, means to support a supply of fabric casing in position to be drawn upon, a freely supported element for holding the casing with its mouth open and with the casing in position to be moved surroundingly past said element and spring-actuated releasable engaging means for so supporting said element.

18. In mechanism of the class described, cooperable with casing and filling material supplies, a tray element having a width adapting it for reception in said casing and provided with side walls substantially the height of the filling to be positioned in the casing, means to advance and retract said element toward and from the casing supply, and a cover plate movable with said tray element but having a vertical movement relatively thereto, lifting to permit the insertion of the filling material, and thereafter seating on the inserted material to insure accurate positioning of the same in said tray element.

19. In mechanism of the class described, a reciprocable tray including bottom and side walls and adapted to receive a mass of filling material to be placed in a casing, means to position the said filling material on the tray, a cover plate on the tray, means to lift the same to permit said positioning of the filling material and then to lower said cover plate, presser means to bring said material to a proper seat in the tray, and means at times engageable with the positioned filling material to prevent movement thereof relative to the tray.

20. In mechanism of the class described, a reciprocable tray including bottom and side walls and adapted to receive a mass of filling material to be placed in a casing, means to position the said filling material on the tray, a cover plate on the tray, means to lift the same to permit said positioning of the filling material and then to lower said cover plate, and presser means to bring said material to a proper seat in the tray.

21. In mechanism of the class described, a reciprocable tray element including bottom and side walls and adapted to receive a mass of filling material for insertion in a casing, and cover means carried by said element but vertically movable relatively thereto to permit the insertion of and thereafter to cover the mass of filling material.

22. In mechanism of the class described, a reciprocable tray including bottom and side walls and adapted to receive a mass of filling material to be placed in a casing, means to position said filling material on the tray, and presser means to insure proper seating of said material upon the tray bottom.

23. In mechanism of the class described, in combination with a reciprocable filling-material-receiving element, a hopper for a stack of filling material packages, means to select the lowermost package from said stack and to move it onto said receiving element while retaining the remaining packages in the stack, and means to position and hold the selected package on said receiving element.

24. In mechanism of the class described, in combination with a reciprocable filling-material-receiving element, a hopper or magazine for the filling material, means to select a mass of said material at the lower portion of said hopper or magazine and to present said selected mass to said receiving element and means to conform said mass to the receiving element and releasably hold it thereon.

25. In mechanism of the class described, in combination, means to support a supply of fabric casing in position to be drawn upon, an elongated element movable toward and from said casing supply, a nipper device at the forward end of said element to engage and draw out the casing, means to hold the mouth of the casing open, and means to cause said nipper device to engage a portion of the opened casing.

26. In mechanism of the class described, in combination, means to support a supply of fabric casing in position to be drawn upon, an elongated element movable toward and from said casing supply, a nipper device at the forward end of said element to engage and draw out the casing, means to hold the mouth of the casing open, means to cause said nipper device to engage a portion of the opened casing, and means subsequently to release the casing.

27. In mechanism of the class described, in combination, means to support a supply of fabric casing in position to be drawn upon, a slide adapted to position a mass of filling material for reception in the casing, reciprocable arms, one at each side of said slide, each having means to engage and draw out the casing over said slide and filling material positioned thereon, other means to hold the casing to the rear of the enclosed filling material, and means to sever the casing adjacent said holding means.

28. In mechanism of the class described, in combination, means to support a supply of fabric casing in position to be drawn upon, a slide adapted to position a mass of filling material for reception in the casing, reciprocable arms, one at each side of said slide, each having means to engage and draw out the casing over said slide and filling material positioned thereon, and other means to grip the casing at the rear of the enclosed filling material.

29. In mechanism of the class described, in combination with a support for a supply of fabric casing of indefinite length and means to open and to draw out the same and to position filling material therein, means including clamping mechanism having fabric engaging and disengaging positions and operating connections therefor, to hold taut the drawn out length of casing, and means to sever a length of casing containing the filling material while so held taut.

30. In mechanism of the class described, in combination with means supporting a fabric casing supply in position to be drawn upon, a slide adapted to position a mass of filling material for reception in the casing, and reciprocable arms, one at each side of said slide, each having means to engage and draw out the casing over said slide and filling material positioned thereon.

31. In mechanism of the class described, in combination with means supporting a fabric casing supply in position to be drawn upon, a slide adapted to position a mass of filling material for reception in the casing, reciprocable arms, one at each side of said slide, jaws on said arms, and means to open and to close said jaws upon the casing.

32. In mechanism of the class described, in combination with means supporting a fabric casing supply in position to be drawn upon, a casing opener, one or more reciprocable nippers movable toward and from the opened end of the casing supply, and cam and spring means to open and close the nippers whereby they are engaged with the inner and outer faces of the leading edge of the opened casing.

33. In mechanism of the class described, for cooperation with a supply of fabric casing of indefinite length adapted to be drawn on and to receive filling material therein, means to hold taut the drawn out length of casing, said means including one or more nipper devices engaging the free end of the casing, a pair of oppositely movable clamping elements at the supply end of said drawn-out length of casing, casing severing means adjacent said clamping elements, and means to release the severed length of casing from said holding means.

34. In mechanism of the class described, for cooperation with a supply of fabric casing of indefinite length adapted to be drawn on and to receive filling material therein, means to hold taut a drawn-out length of casing, said means including one or more nipper devices engaging the free end of the casing, and a pair of oppositely movable clamping elements adjacent the supply end of said drawn-out length of casing.

35. In mechanism of the class described, for cooperation with a supply of fabric casing of indefinite length adapted to be drawn on and to receive filling material therein, means to hold taut the drawn out length of casing, said means including one or more nipper devices engaging the free end of the casing, a pair of oppositely movable clamping elements at the supply end of said drawn-out length of casing, and casing severing means adjacent said clamping elements.

36. That method of forming surgical dressings, sanitary napkins, and the like which comprises supporting a substantially tubular fabric casing supply in closed condition and in readiness to be drawn upon, positioning the desired quantity of filling material in a manner adapting the same for reception in the casing, opening the leading end of the casing within the normal opening capacity thereof while avoiding substantial lateral stretching, effecting intermittently relative movement of said normal-opened casing and filling to bring the latter within the casing, mechanically holding the filled casing portion in extended position for severance, and severing the portion of the casing containing the filling from said casing supply.

37. In mechanism of the class described, in combination, a frame, a filler presenting tray, means to position a filler thereon, a pair of arms at opposite sides of said tray and having nippers at one end, and means to actuate the latter to seize and withdraw a length of casing about the filler in said tray.

38. In mechanism of the class described, in combination, a frame, a filler presenting tray, means to position a filler thereon, reciprocable casing engaging means, and means to actuate the latter to draw the casing over the tray and filler thereon.

39. Mechanism of the class described comprising, in combination, a magazine for pre-formed absorbent pad fillers, means to present such filler for reception in a tubular casing coming from a supply, means operable to engage said tubular casing and to move it engagingly about and past said presented absorbent pad filler to position the latter within said casing, and means to sever the casing in the rear of the positioned filler.

40. Mechanism of the class described comprising, in combination, a reciprocable filler holding element adapted for reception in a casing coming from a supply, means to open the casing for the reception of said element and filler, means to engage and draw out the casing to enclose a filler positioned in said element, and means to withdraw said element, leaving the filler within the casing.

41. Mechanism of the class described comprising, in combination, a reciprocable filler holding element adapted for reception in a casing coming from a supply, means to open the casing for the reception of said element and filler, and means to engage and draw out the casing to enclose a filler positioned in said element.

42. Mechanism of the class described comprising, in combination, a reciprocable filler holding element adapted for reception in a casing coming from a supply, means to open the casing for the reception of said element and filler, means to engage and draw out the casing to enclose a filler positioned in said element, means to withdraw said element leaving the filler within the casing, and means to cut off a length of casing containing said filler.

43. Mechanism of the class described comprising, in combination, a magazine for absorbent filling material, a support for a tubular casing supply, a filling holding device comprising bottom and upright side portions and a relatively movable covering portion, said device adapted to receive filling from said magazine and to present the same for reception in the casing coming from said support, means to engage and move the casing about said filling holding device and the filling contained therein, and means to withdraw the filling holding device from the filled casing portion.

44. Mechanism of the class described comprising, in combination, a magazine for absorbent filling material, a support for a tubular casing supply, tray-like means adapted to receive and enclose a mass of filling for positioning in the tubular casing material, mechanism for effecting relative movement of the filling mass so positioned and of the tubular material to place the filling within the latter, and means subsequently to withdraw said tray-like means.

ERROLD B. THOMAS.